United States Patent [19]
Gormley

[11] 3,905,943
[45] Sept. 16, 1975

[54] PREPARATION OF FUMARATES

[75] Inventor: William T. Gormley, Pittsburgh, Pa.

[73] Assignee: Koppers Company, Inc., Pittsburgh, Pa.

[22] Filed: Apr. 16, 1973

[21] Appl. No.: 351,188

[52] U.S. Cl........ 260/75 UA; 260/75 T; 260/485 R; 260/485 G
[51] Int. Cl...................... C08g 17/10; C07c 69/60
[58] Field of Search....... 260/485 R, 485 G, 75 UA, 260/75 T

[56] References Cited
UNITED STATES PATENTS
3,256,327   6/1966   Russell et al...................... 260/485

FOREIGN PATENTS OR APPLICATIONS
1,165,586   3/1964   Germany

OTHER PUBLICATIONS

Szmercsanyi et al., J. Appl. Polym. Sci. 10, 513–522, (1966).

Flory, Principles of Polymer Chemistry, Cornell Univ. Press, Ithaca, N.Y., 1953, pp. 69–70, 102–103.

Primary Examiner—Melvin Goldstein
Attorney, Agent, or Firm—Synnestvedt & Lechner

[57] ABSTRACT

Fumarates, including polyesters having a fumarate structure, are prepared by isomerizing the corresponding maleate with a catalytic amount of a carboxylic acid halide of an unsaturated aliphatic dicarboxylic acid, for example, difumaryl chloride.

6 Claims, No Drawings

PREPARATION OF FUMARATES

FIELD OF THE INVENTION

This invention relates to the preparation of fumarates, including polyesters having a fumarate structure. More particularly, this invention relates to the preparation of the aforementioned fumarates by the use of an isomerization catalyst.

Fumarates, such as monoalkyl and dialkyl fumarates, are known materials which are useful in industrial applications. For example, they can be used as monomers in preparing copolymers such as alkyl fumarate/vinyl pyrrolidone copolymers (used as adhesives) and dibutyl fumarate/vinyl acetate copolymers (used in exterior latex paints). Also, thermosetting acrylics which are crosslinkable with epoxy or amino resins have been prepared by copolymerizing mono- and di-alkyl fumarates with acrylates. Transparent and colorless films used widely for food packaging are prepared by copolymerizing dibutyl fumarate and vinyl chloride. In addition, coatings for tin plate have been prepared from dialkyl fumarate/vinyl chloride copolymers and phenolic resins.

Various methods have been used to prepare alkyl fumarates. (The term "alkyl fumarates" when used herein includes monoalkyl and dialkyl fumarates.) For example, one method involves the esterification of fumaric acid. However, fumaric acid has a relatively high melting point and the esterification reaction is very slow. Another general method used to prepare alkyl fumarates is to isomerize the corresponding maleate ester in the presence of isomerization catalysts. This invention relates to an improved process for isomerizing alkyl maleates to alkyl fumarates in the presence of an isomerization catalyst.

Unsaturated polyesters prepared by reacting an ethylenically unsaturated dicarboxylic acid (or an anhydride thereof), a polyol and, optionally, a saturated dicarboxylic acid (or an anhydride thereof) are also widely used industrial materials. Such polyesters can be reacted or cured with a vinyl monomeric crosslinking agent, such as styrene, and formed into thermoset articles which have relatively good physical and electrical properties and good chemical resistance and weathering characteristics.

Presently, maleic anhydride is the most widely used unsaturated dicarboxylic anhydride for preparing the aforementioned type of polyesters. It is lower in cost than maleic acid, and the polyesterification of maleic anhydride is accomplished much more easily than that of its isomer fumaric acid. However, it is well recognized that certain properties of the cured polyester are better the higher the fumarate content of the unsaturated polyester. It has been reported that the fumarate structure in a polyester can be as 20 times more reactive with styrene than a maleate structure. The presence of the fumarate structure in the polyester can result in an upgrading of the properties of the cured product.

Polyesters having a fumarate concentration or structure can be prepared from fumaric acid. However, this material is relatively expensive, has a relatively high boiling point and is difficult to dissolve. Thus, the polyesterification of fumaric acid is attendant with problems.

Polyesters having some fumarate concentration can be prepared also from maleic acid or maleic anhydride in accordance with known techniques. For example, careful control of the polyesterification reaction conditions can result in partial isomerization of the maleate structure to a fumarate structure. It is known also that unsaturated polyesters containing as much as 100% of a fumarate structure can be prepared from maleic anhydride or maleic acid by incorporating in the polyesterification reaction mixture catalysts which isomerize the maleate to fumarate. This invention is related to such a catalyst.

REPORTED DEVELOPMENTS

Heretofore known methods for isomerizing alkyl maleates to alkyl fumarates include the use of various types of catalysts, including, for example, aqueous or anhydrous HCl and anhydrous HBr, amines and a variety of sulfur compounds. Some disadvantages of utilizing such catalysts are the difficulty of removing the catalyst from the isomerized ester and undesirable color or other objectionable results that are caused by traces of the catalyst being left in the reaction product.

Catalysts have been used also to isomerize the maleate structure of polyesters to a fumarate structure. Examples of such catalysts include secondary amines and various sulfur compounds. Some disadvantages that are encountered in the use of such catalysts are incompatibility with the polyester resin and objectionable side reactions that may take place if the catalyst is not removed from the product.

In view of the above, it is an object of this invention to provide an improved process for preparing fumarates, including polyesters having at least a portion of its structure comprised of fumarate.

It is another object of this invention to provide an improved process for preparing alkyl fumarates and polyesters containing a fumarate structure by the use of an isomerization catalyst.

BRIEF DESCRIPTION OF THE INVENTION

The above objects are attained and important advantages are afforded by this invention which is directed to a process for isomerizing an ester in which at least part of its structure comprises maleyl, that is, the group

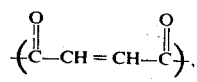

by contacting said ester with a catalytic amount of a carboxylic acid halide catalyst for a period of time sufficient to isomerize at least a portion of said maleyl to fumaryl, that is, the group

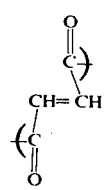

The carboxylic acid halide catalyst for use in this invention is either a carboxylic acid halide derived from a 1, 2 ethylenically unsaturated aliphatic dicarboxylic acid or one derived from itaconic acid, which, it is noted, is a position isomer of citraconic acid. Citraconic acid is a 1, 2 ethylenically unsaturated aliphatic dicarboxylic acid.

The preferred carboxylic acid halide catalyst for use in this invention is fumaryl dichloride. Excellent results have been achieved with this catalyst and it is a material which is readily available.

It is believed that the isomerization catalyst of the present invention will be used most widely in isomerizing the maleate structure of alkyl maleates and of polyesters to the fumarate structure. The isomerization can be effected in situ, that is, by including the catalyst in the reaction mixture from which the alkyl maleates or polyesters are prepared, or by contacting preformed alkyl maleates or polyesters with the catalyst.

The use of the carboxylic acid halide catalyst in accordance with this invention has a number of advantages. The catalyst at the temperatures of reaction is a liquid which generally will be similar in chemical and physical properties to the reactants. Thus, the catalyst can be introduced easily into the reaction. The catalysts, which are quite similar to the acid or anhydride reactants of the esterification reaction, can react with the alcoholic reactants and be converted to an end product which, depending on the specific catalyst used, can be the same as or very similar to the fumarate being produced. For example, in the use of fumaryl chloride as the catalyst, it can react with the alcohol to form additional fumarate. On the other hand, the use of a catalyst such as mesaconyl chloride will produce a product which is very similar to fumarate being formed. Because of this similarity and because of the relatively small amounts of catalyst used, it need not be separated from the fumarate product.

The use of the isomerization catalysts described herein can produce polyesters having a fumarate/maleate ratio of 100%. One hundred percent yields of alkyl fumarates can be attained. Another characteristic of the catalysts of this invention is that they can be used to produce in situ dialkyl fumarates which are suitable for reacting with vinyl chloride to produce transparent colorless films. The dialkyl fumarates do not have to be distilled or otherwise refined as is necessary with the use of some other types of catalysts to produce dialkyl fumarates of suitable color.

Other advantages of the present invention include compatibility of the catalyst with various maleate compounds which are to be isomerized and the ability of the catalyst itself to form fumarate esters.

DETAILED DESCRIPTION OF THE INVENTION

As mentioned hereinabove, the present invention can be used to isomerize an ester which contains the maleyl group. The maleyl group can be present in aliphatic maleates, for example, alkyl and alkenyl maleates, alicyclic maleates, and aromatic maleates.

It is believed that the present invention will have its widest applicability in isomerizing dialkyl maleates having about 1 to about 8 carbon atoms in the alkyl groups. Presently, such maleates are the ones most popularly used. However, the present invention can be used to isomerize monoalkyl and dialkyl maleates having more than 8 carbon atoms in the alkyl groups, for example about 12 carbon atoms. Processes for preparing both monoalkyl maleates and dialkyl maleates are well known. Maleic anhydride or maleic acid can be used as the acid reactant. Examples of aliphatic alcohols or alkanols that can be used in the esterification reaction are methanol, propanol, isobutyl alcohol, isoctyl alcohol, n-decyl alcohol, and dodecyl alcohol. It is noted that alkenyl and alicyclic alcohols can be used to prepare respectively ethylenically unsaturated maleates and alicyclic maleates which can be isomerized according to the present invention. Examples of such alcohols are allyl alcohol and cyclohexanol. Lower molecular weight or higher molecular weight alcohols, for example those containing 12 or more carbon atoms can be used to prepare the alkenyl or alicyclic maleate.

The alkyl fumarates prepared in accordance with this invention can be produced by adding the carboxylic acid halide catalyst to the esterification reaction mixture prior to, during or after the reaction, thereby forming the fumarate in situ, or by contacting the alkyl maleate with the catalyst after it is separated from the reaction mixture.

In preparing the alkyl fumarate in situ, typical esterification reaction conditions can be used. The proportion of maleic acid or maleic anhydride and the alkanol used will depend on whether it is desired to prepare a monoalkyl or a dialkyl fumarate. When preparing the former, there should be used about equimolar amounts of the reactants, and for the latter a 2/1 molar ratio of alkanol to the maleic anhydride or maleic acid. In either case an excess of alcohol can be used, for example, about a 10% molar excess. The temperature of the esterification reaction will depend on the materials being reacted and can vary over a wide range, for example, from about room temperature (about 25°C) to about 200°C. The upper limit of the reaction temperature is generally governed by the thermal stability of the reactants and product. In order to produce good yields of the fumarate in a reasonable amount of time, it is recommended that temperatures of about 50°C to about 150°C be used, depending on the particular reactants. The time of reaction is not critical. In general, the longer the reaction time, the higher the yield of alkyl fumarate. The time it will take to produce substantial yields of the alkyl fumarate, for example, about 90 wt. % or higher, will depend on a number of factors, including the amount of isomerization catalyst, the temperature of the reaction, the particular material being isomerized, etc. For guideline purposes, it is recommended that reaction times of about 0.5 to about 3 hours be used. However, it should be understood that for a particular reaction, the time can be best selected on the basis of experience.

In preparing the reaction mixture, the carboxylic acid halide catalyst can be added to the reaction vessel with the esterification reactants or it can be added after the esterification reaction has begun or after it has been completed.

Isomerization reaction conditions that can be used to isomerize a previously formed alkyl maleate to the corresponding fumarate are as follows. The temperature can vary over a wide range, for example, about room temperature to about 200°C, depending on the maleate being isomerized. Relatively high yields of the alkyl fumarate can be produced within reasonable times at a temperature of about 50°C to about 120°C, depending on the particular material being isomerized. Generally speaking, the upper temperature limit will be governed by the thermal stability of the product. The time of reaction is not critical. In general the longer the reaction time, the higher the yield of alkyl fumarate. The time it will take to produce substantial yields of the alkyl fumarate, for example, about 90 wt. % or higher, will depend on a number of factors, including the amount of isomerization catalyst, the temperature of the reaction, the particular material being isomerized, etc. For guideline purposes, it is recommended that reaction times of about 0.5 to about 3 hours be used. However, it should be understood that for a particular reaction, the time can be best selected on the basis of experience.

It should be understood that the present invention can be utilized to isomerize alkyl maleates, including both monoalkyl maleates and dialkyl maleates and mixtures thereof. Mixtures of different monoalkyl maleates and different dialkyl maleates can be isomerized also.

The unsaturated polyester which can be isomerized in accordance with the present invention is any polyester in which at least part of its structure comprises maleyl, that is, the group

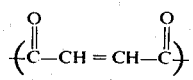

The preparation of such polyesters is well known. Speaking generally, they are prepared by reacting maleic anhydride or maleic acid with a polyol. Polyesters containing the maleyl group can be produced also by reacting fumaric acid with a polyol as a result of isomerization which occurs during the polyesterification. The most widely available polyesters are prepared from maleic anhydride; this material melts at a relatively low temperature and is relatively low in cost.

It is well known to include in the polyesterification reaction other reactants, for example, other ethylenically unsaturated polycarboxylic acids and saturated polycarboxylic acids. Specific examples of reactants for preparing unsaturated polyesters include chloromaleic acid, itaconic acid, citraconic acid, mesaconic acid, ethylene glycol, propylene glycol, butylene glycol, diethylene glycol, dipropylene glycol, cyclohexanedimethanol, phthalic anhydride, isophthalic acid, tetrahydrophthalic anhydride, succinic acid, azelaic acid, sebacic acid, glycerol, pentaerythritol, trimellitic acid and pyromellitic acid.

The acid number and molecular weight of the unsaturated polyester can vary over a wide range, for example, respectively from about 3 to about 100 and from about 750 to about 5,000 or higher. It is believed that the present invention will have its widest use in preparing unsaturated polyesters known as the general purpose type. Such polyesters are generally made from maleic anhydride, a glycol, and a saturated dicarboxylic acid, and have a molecular weight within the range of about 1,000 to about 2,000 and an acid number within the range of about 20 to about 30.

The unsaturated polyester containing fumaryl in its structure can be prepared by adding the carboxylic acid halide catalyst to the polyesterification reaction mixture prior to, during or after the reaction, thereby forming the polyester having a higher fumaryl content in situ, or by contacting the polyester with the catalyst after it is separated from the reaction mixture.

In preparing the polyester is situ, standard equipment and techniques which are employed in preparing unsaturated polyesters can be used. For example, the polyesterification reaction should be carried out under an inert blanket of gas such as nitrogen, and the reaction vessel should be equipped with a stirrer and means for removing water formed from the esterification reaction. In addition, a gelation inhibitor such as, for example, hydroquinone can be added to the reaction mixture. Also, the polyesterification reaction can be carried out in the presence of an esterification catalyst. The ratio of the amounts of acid or anhydride and polyol charged to the reaction vessel can be a ratio used typically in a polyesterification reaction. Speaking generally, the total moles of acid or anhydride present in the reaction mixture should be about equal to the total moles of polyol used; however, it is usually preferred that there be charged to the reaction vessel an excess of about 10 moles % of the polyol. The excess polyol can compensate for losses due to boiling-off of this ingredient. A one-stage or two-stage reaction can be used depending on the reactants used.

The temperature of the polyesterification reaction can vary over a wide range, for example, from about 150°C to about 220°C. The upper temperature limit is governed generally by boiling points of reactants and thermally initiated crosslinking tendencies of the unsaturated polyester. In order to produce satisfactory yields of the fumaryl-containing polyester in reasonable periods of time, it is recommended that a temperature of about 175°C to about 210°C be used. The time of reaction is not critical. In general, the longer the reaction time, the higher the yield of the polyester and the higher the fumaryl content thereof. The time it will take to produce substantial yields of a polyester having relatively high fumaryl content, for example, about 90 wt. % or higher, will depend on a number of factors, including the amount of catalyst, the temperature of reaction, the particular material being isomerized, etc. For guideline purposes, it is recommended that reaction times of about 12 to about 20 hours be used. However, it should be understood that for a particular reaction, the time can be best selected on the basis of experience.

In preparing the reaction mixture, the carboxylic acid halide catalyst can be added to the reaction vessel with the polyesterification reactants or it can be added after the polyesterification reaction has begun or after it has been completed.

Isomerization reaction conditions that can be used to isomerize the maleyl group of a previously formed polyester are as follows. The temperature can vary over a wide range, for example, about 50°C to about 220°C. Relatively high yields, for example, polyesters having a fumarate/maleate ratio in excess of about 90 wt. % can be produced within reasonable times at a temperature of about 175°C to about 210°C. Generally speaking, the upper temperature limit will be governed by the crosslinking tendency of the unsaturated polyester. The time of reaction is not critical. In general, the longer the reaction time, the higher the fumarate/maleate ratio in the polyester. The time it will take to produce substantial yields of the fumaryl group will depend on a number of factors, including the amount of isomerization catalyst, the temperature of the reaction, the particular material being isomerized, etc. For guideline purposes, it is recommended that reaction times of about 1 to about 6 hours be used. However, it should be understood that for a particular reaction, the time can be best selected on the basis of experience.

In effecting the isomerization reactions described hereinabove, a solvent may or may not be used, depending on the reactants and the product being made. In many situations it is not necessary to use a solvent because many of the reactants and catalyts are liquids at the temperatures of reaction. However, in conducting some reactions, it is advantageous to include a solvent in the reaction mixture to aid in dispersing a solid product, for example, dimethyl fumarate, that is being made; this gives a slurry which can be more easily stirred. Solvents can be used also to aid in the removal of water which is produced by the esterification or polyesterification reaction. Examples of suitable solvents that can be used are benzene, xylene, toluene and ethyl acetate.

In general, the isomerization reactions can be carried out conveniently at atmospheric pressure. However, if desired, lower or higher pressures can be used.

The isomerization catalyst for use in this invention is an acid halide of itaconic acid or an acid halide of a 1,2 ethylenically unsaturated aliphatic dicarboxylic acid having the formula

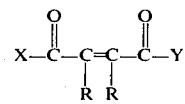

wherein X is a halogen, Y is a halogen or hydroxyl, and wherein R, which can be the same or different, is hydrogen, alkyl having 1 to about 6 carbon atoms or more, or a halogen.

Excellent results have been obtained using the acid chlorides. The acid bromides can be used also. The acid fluorides and iodides, which have a tendency to be unstable, are not available commercially.

Specific examples of acid halides of the above formula include fumaryl monochloride, fumaryl dichloride, maleyl monochloride, maleyl dichloride and citroconyl mono- or di-chloride. The corresponding bromides are additional examples of the acid halides.

The preferred catalyst is fumaryl dichloride.

There are numerous factors which tend to influence the amount of carboxylic acid halide catalyst selected for use, including, for example, the ester being isomerized, the temperatures and time of reaction, and yield of alkyl fumarate or fumaryl-containing polyester desired, etc. Although smaller or larger amounts of the catalyst can be used, depending on the factors mentioned above, it is recommended that the catalyst be used in amounts within the range of about 0.5 to about 10 mole % based on the moles of maleate structure to be isomerized. When amounts below about 0.5 mole % are used, the isomerization tends to be rather slow. Although amounts above about 10 mole % can be used, such amounts do not result in any particular advantages. A preferred amount of catalyst is about 1 to about 5 mole %. Such amounts give satisfactory reaction rates at reasonable reaction temperatures.

The mechanism by which the isomerization catalyst of this invention functions is not understood. As described above, the catalyst of the present invention is effective in isomerizing "preformed" alkyl maleates or unsaturated polyesters having a maleate structure. This would appear to be evidence that the catalyst acts directly on the maleate structure. However, it is considered possible that when the catalyst is added to the reaction mixture from which the esters or polyesters are prepared, the catalyst may isomerize the maleic anhydride or maleic acid reactants to fumaric acid which in turn forms esters or polyesters having the fumarate structure.

Examples set forth below illustrate the practice of the present invention. Comparative examples are set forth also. The fumaryl chloride catalyst referred to in the examples is fumaryl dichloride.

EXAMPLES

The first two examples show the preparation of monomethyl maleate and the isomerization thereof to monomethyl fumarate by the use of fumaryl chloride.

EXAMPLE 1

Maleic anhydride (0.5 mole) and 0.6 mole of absolute methanol were stirred together for 6 hours at 50°–60°C. The resulting viscous liquid containing monomethyl maleate was left overnight. Thereafter, 0.02 mole of fumaryl chloride was added to the maleate with stirring at a temperature of 50°C. After about 10 minutes, crystallization of monomethyl fumarate began and at that time 100 ml. of xylene was added. The resulting slurry was stirred for 1 hour at 50°C and then left overnight. Monomethyl fumarate was separated from the slurry by filtration. The yield of monomethyl fumarate was 63.0 g (97 wt. %); it had a melting point of 34°–160°C and a titration value of 95.0%. The structure of the monomethyl fumarate was confirmed by spectrometric examination.

EXAMPLE 2

Three moles of maleic anhydride and 1.5 moles of absolute methanol were charged to a 2 liter reaction kettle equipped with a mechanical stirrer, reflux condenser, thermometer and addition funnel. After the stirred mixture was heated for 1 hour by means of a 50°C water bath, an additional 1.65 moles of methanol were added over a 0.25 hour period and heating at 50° – 60°C was continued for 2 hours. The resulting viscous liquid containing monomethyl maleate was left overnight. Thereafter, 0.05 mole of fumaryl chloride was added to the reaction mixture with stirring, and it was heated by means of a 60°C water bath. Crystallization began after about 10 minutes and the exotherm increased the temperature of the mixture to 115°C. The mixture was heated for 2.5 hours at 80°C (temperature maintained by exotherm), as 3 ml of xylene were added gradually in order to obtain a slurry which could be stirred. The reaction mixture was left overnight and then an additional 300 ml of xylene were added to the slurry of monomethyl maleate. The yield of monomethyl fumarate was about quantitative.

The next example shows the preparation of di(2-ethylhexyl) fumarate utilizing fumaryl chloride.

EXAMPLE 3

A stirred mixture of maleic anhydride (1.0 mole), 2-ethyl-1-hexanol (2.2 moles) and fumaryl chloride (10 g) was heated by means of a 50°C water bath for 0.5 hr. (slight exotherm). After the temperature was raised to 100°C during 1.5 hr., at a pressure of 135 mm and with air sparge, distillation of water into a Dean-Stark trap began. As the temperature was gradually increased to 170°C during 4 hrs., 18 g of water and a few ml of alcohol were collected in the Dean-Stark trap. The condenser was then set for downward distillation and the excess alcohol distilled at 5 mm pressure as the temperature was increased from 90°C to 170°C during 3 hours. The transferred product (350 g) was a slightly viscous liquid shown by spectrometric analysis to be about 100% di(2-ethylhexyl) fumarate.

The next example shows the preparation of a mixture of mono- and di-(2-ethylhexyl) fumarates utilizing fumaryl chloride.

EXAMPLE 4

A stirred mixture of maleic anhydride (0.50 mole), 2-ethyl-1-hexanol (0.50 mole) and fumaryl chloride (4.0 g) was heated for 2 hrs. at 75°–80°C. The resulting cloudy liquid was filtered to remove a small amount of fumaric acid. Spectrometric examination indicated the remaining product to be a mixture containing 75 mole percent of a 60/40 molar ratio of mono- and diesters of fumaric and maleic acids, the fumarate/maleate ratio being 86/14. The product also contained maleic anhydride and two different unidentified succinate structures.

The next example shows the preparation of methyl hydrogen fumarate utilizing fumaryl chloride.

EXAMPLE 5

After a mixture of maleic anhydride (0.50 mole) and methanol (0.25 mole) had been stirred for 1.5 hr. at 55°–60°C, additional methanol (0.30 moles) was added dropwise during 15 minutes, and heating at 60°C was continued for 2 hrs. Fumaryl chloride (2.8 g) was then added at room temperature and the stirred mixture was heated by means of a 50°C water bath. An exotherm caused the pot temperature to reach a maximum of 78°C, and crystals began to deposit 0.5 hr. after addition of the catalyst. It was necessary to add xylene (total 100 ml) to give a slurry so that stirring could be continued for 7 hrs. at about 60°C. The filtered solid was vacuum dried to give a 97% yield of methyl hydrogen fumarate; the product was identified by spectrometric analysis, melting point, neutralization equivalent, and conversion to a derivative.

The next three examples show the preparation of dimethyl fumarate utilizing fumaryl chloride.

EXAMPLE 6

A mixture of dimethyl maleate (144 g) and fumaryl chloride (6 g) was stirred at room temperature. Crystals began to deposit in the solution after 1 hour, and stirring of the mass of crystals was no longer possible after 3 hours. After standing five days, the product was washed with methanol to yield a main crop of 112 g (78.0%) of dimethyl fumarate; melting point 98°–103°C. The structure was confirmed by spectrometric examination.

EXAMPLE 7

A mixture of 576 g of dimethyl maleate and 23 g of fumaryl chloride was stirred at room temperature. Crystals began to deposit after one-half hour, and stirring of the crystalline mass became difficult after 3 hours. After standing 6 days, the product was pulverized and washed with two 300-ml portions of methanol to yield 500 g (86%) of dimethyl fumarate, melting point 99°–101°C. Spectrometric analysis confirmed the structure and indicated dimethyl maleate to be less than 1%, if present.

EXAMPLE 8

A mixture of 576 g of dimethyl maleate and 23 g of fumaryl chloride was stirred at room temperature. After stirring for several hours, the product was left for four days, and then washed with methanol to yield 424 g of dimethyl fumarate (73.5% recovery in first crop), melting point 97°–101°C. Spectrometric analysis indicated a 95/5 fumarate to maleate content.

The next 2 examples show the preparation of fumarate esters, including higher molecular weight polyesters, prepared from ethylene glycol and utilizing fumaryl chloride.

EXAMPLE 9

A stirred mixture of maleic anhydride (0.50 mole), ethylene glycol (0.50 mole) and fumaryl chloride (4 g) was heated for about 2 hours at 60°–70°C. The cloudy, white product was shown by spectrometric examination to contain a 55/45 fumarate/maleate mixture, the monoester to polyester ratio being 60/40.

EXAMPLE 10

Maleic anhydride (3.0 moles) and ethylene glycol (3.3 moles) were charged to a 1 liter resin kettle equipped with a mechanical stirrer, thermometer, air sparge tube and Dean-Stark trap topped by a reflux condenser connected to vacuum pump. The stirred mixture was heated to 105°C during 0.5 hr. to yield a clear mixture. Fumaryl chloride (10 g) was added at 45°C and the stirred mixture was gradually heated to 200°C during 2 hrs., and held at that temperature for 4 hrs.; a total of 56 g of distillate (mainly water) was collected in the Dean-Stark trap. A nitrogen sparge was used during the final 2 hrs. of heating. The Dean-Stark trap was removed and heating continued for 2 hrs. at 145°–210°C at 5 mm pressure. The fumarate/maleate ratio of the resulting resin (403 g) was 95/5. Molecular weight and acid number were not determined due to poor solubility of the resin in usual solvents.

The next example shows the preparation of fumarate esters, including higher molecular weight polyesters, prepared from triethylene glycol and utilizing fumaryl chloride.

EXAMPLE 11

A stirred mixture of maleic anhydride (0.50 mole), triethylene glycol (0.50 mole) and fumaryl chloride (4 g) was heated for about 2 hours at 60°–65°C. The cloudy, white product was shown by spectrometric examination to contain a 50/50 fumarate/maleate mixture, the monoester to polyester ratio being 33/67.

The next two examples show the preparation of fumarate esters from propylene glycol and the use of fumaryl chloride.

EXAMPLE 12

A stirred mixture of maleic anhydride (0.50 mole), propylene glycol (0.50 mole) and fumaryl chloride (4 g) was heated for about 2 hours at 65°–80°C. The cloudy, viscous product was shown by spectrometric analysis to be the monopropyleneglycol ester, contaminated with 7 mole percent diester. The fumarate/maleate ratio was 70/30.

EXAMPLE 13

Maleic anhydride (8.0 moles) and propylene glycol (8.8 moles) were charged to a 2 liter resin kettle equipped with a mechanical stirrer, thermometer, air sparge tube and Dean-Stark trap topped by a reflux condenser connected to a vacuum pump. The stirred mixture was heated to 95°C during 1 hr., the clear solution cooled to 55°C, and 26 g of fumaryl chloride was added. The stirred mixture was heated, with nitrogen sparge, for 3 hrs. at 135°–185°C and held at 185°–195°C for 10 hrs. A total of 145 g of distillate was collected in the Dean-Stark trap. The resin weighed 1190 g and had a molecular weight of 1,695 and an Acid No. of 31.0.

The next group of examples shows the preparation of esters from maleic anhydride and certain of the alcohols used in preparing the esters in the preceding examples, but in the absence of fumaryl chloride catalyst. The fumarate/maleate ratios of preceding examples and the examples below are set forth in Table 1 which follows the examples below.

EXAMPLE A

A stirred mixture of maleic anhydride (1.0 mole) and 2-ethyl-1-hexanol (2.2 moles) was heated by means of a 65°C water bath for 1.0 hr. (slight exotherm). After the temperature was raised to 120°C during 1.5 hr., at a pressure of 135 mm. and with air sparge, distillation of water into a Dean-Stark trap began. As the temperature was gradually increased to 150°C during 7 hrs., 14 g of water and a few milliliters of alcohol were collected in the Dean-Stark trap. The condenser was then set for downward distillation and the excess alcohol distilled at 5 mm pressure as the temperature was increased from 90°C to 170°C during 3 hrs. The transferred product (300 g) was a slightly viscous liquid shown by spectrometric analysis to contain 82% di-(2-ethylhexyl) maleate and 18% di-(2-ethylhexyl) fumarate.

EXAMPLE B

A stirred mixture of maleic anhydride (0.50 mole) and 2-ethyl-1-hexanol (0.50 mole) was heated by means of a water bath for 2 hrs. at 75°–80°C. The resulting water-white, clear, slightly viscous liquid was shown by spectrometric examination to be mono(2-ethylhexyl)maleate contaminated with maleic anhydride and the corresponding diester; no fumarate structure was detected.

EXAMPLE C

A stirred mixture of maleic anhydride (2.0 moles) and ethylene glycol (2.0 moles) was heated for about 2 hours at 65°–75°C. The water-white, clear viscous product was shown by spectrometric analysis to be monoethyleneglycol maleate (no fumarate) contaminated with ethylene glycol, polyester and water.

EXAMPLE D

Maleic anhydride (3.0 moles) and ethylene glycol (3.3 moles) were charged to 1 liter resin kettle equipped as set forth in Example 10. The stirred mixture was heated for 4 hr. as the temperature was gradually raised from 65°C. (clear solution) to 200°C, while collecting 38 g of water in the Dean-Stark trap. A nitrogen sparge was then introduced and heating continued for 3 hrs. at 200°–210°C, while collecting an additional 6 g of water. The Dean-Stark trap was then removed and heating continued for 1 hr. at 150°–195°C at 5 mm pressure. The resulting resin weighed 431 g. The molecular weight was 998 and that Acid No. was 35.0. The fumarate/maleate ratio was 74/26.

EXAMPLE E

A stirred mixture of maleic anhydride (4.0 moles) and triethylene glycol (4.0 moles) was heated for about 2 hours at 60°–90°C. The clear, light amber product was shown by spectrometric analysis to contain 35 mole percent mono (triethylene glycol) maleate and 65 mole percent triethylene glycolmaleate polyester. No fumarate was present.

EXAMPLE F

A stirred mixture of maleic anhydride (2.0 moles) and propylene glycol (2.0 moles) was heated for about 2 hours at 65°–90°C. The water-white, clear, viscous product was shown by spectrometric analysis to be monopropyleneglycol maleate (only 3 percent fumarate), contaminated with propylene glycol.

Table 1

| Ex. No. | Alcohol Used in Preparing Ester | Fumaryl Chloride | Fumarate/Maleate Ratio* |
|---|---|---|---|
| 3 | 2-ethyl-1-hexanol | Yes | 100/0 |
| A | " | No | 18/82 |
| 4 | " | Yes | 86/14 |
| B | " | No | 0/100 |
| 9 | ethylene glycol | Yes | 55/45 |
| C | " | No | 0/100 |
| 10 | " | Yes | 95/5 |
| D | " | No | 74/26 |
| 11 | triethylene glycol | Yes | 50/50 |
| E | " | No | 0/100 |
| 12 | propylene glycol | Yes | 70/30 |
| F | " | No | 3/97 |

*Determined by spectrometrics analysis.

Examples presented herein illustrate that the present invention can be used to isomerize the maleate structure of various types of esters to a fumarate structure under various reaction conditions and that esters having a fumarate/maleate ratio of 100%/0% can be produced.

It is believed that the invention will have its widest applicability of use in preparing the alkyl fumarates and fumaryl-containing polyesters in situ. In the overall picture, this is more economical than isomerizing preformed esters and polyesters. However, as described hereinabove and as illustrated in certain of the examples herein, preformed esters and polyesters can be isomerized in accordance with this invention.

I claim:

1. An in situ process for preparing a dialkyl fumarate in a yield of at least about 90 wt. % comprising esterifying, under conditions which form a diester, maleic anhydride, maleic acid, or a monoester thereof with an alcohol in the presence of about 0.5 to about 10 mole % of fumaryl dichloride.

2. A process according to claim 1 wherein the reaction is conducted at a temperature within the range of about 50°C to about 150°C and for a period of time of about 0.5 to about 3 hours.

3. A process according to claim 1 wherein the amount of said fumaryl dichloride is about 1 to about 5 mole %.

4. An in situ process for preparing a polyester wherein of the total of the fumarate/maleate content thereof, the fumarate comprises about 90 to 100% comprising esterifying, under conditions which form a polyester, maleic anhydride, maleic acid, fumaric acid or a monoester thereof with a polyol in the presence of about 0.5 to about 10 mole % of fumaryl dichloride.

5. A process according to claim 4 wherein the reaction is conducted at a temperature within the range of about 150°C to about 220°C.

6. A process according to claim 4 wherein the amount of said fumaryl dichloride is about 1 to about 5 mole %.

* * * * *